UNITED STATES PATENT OFFICE.

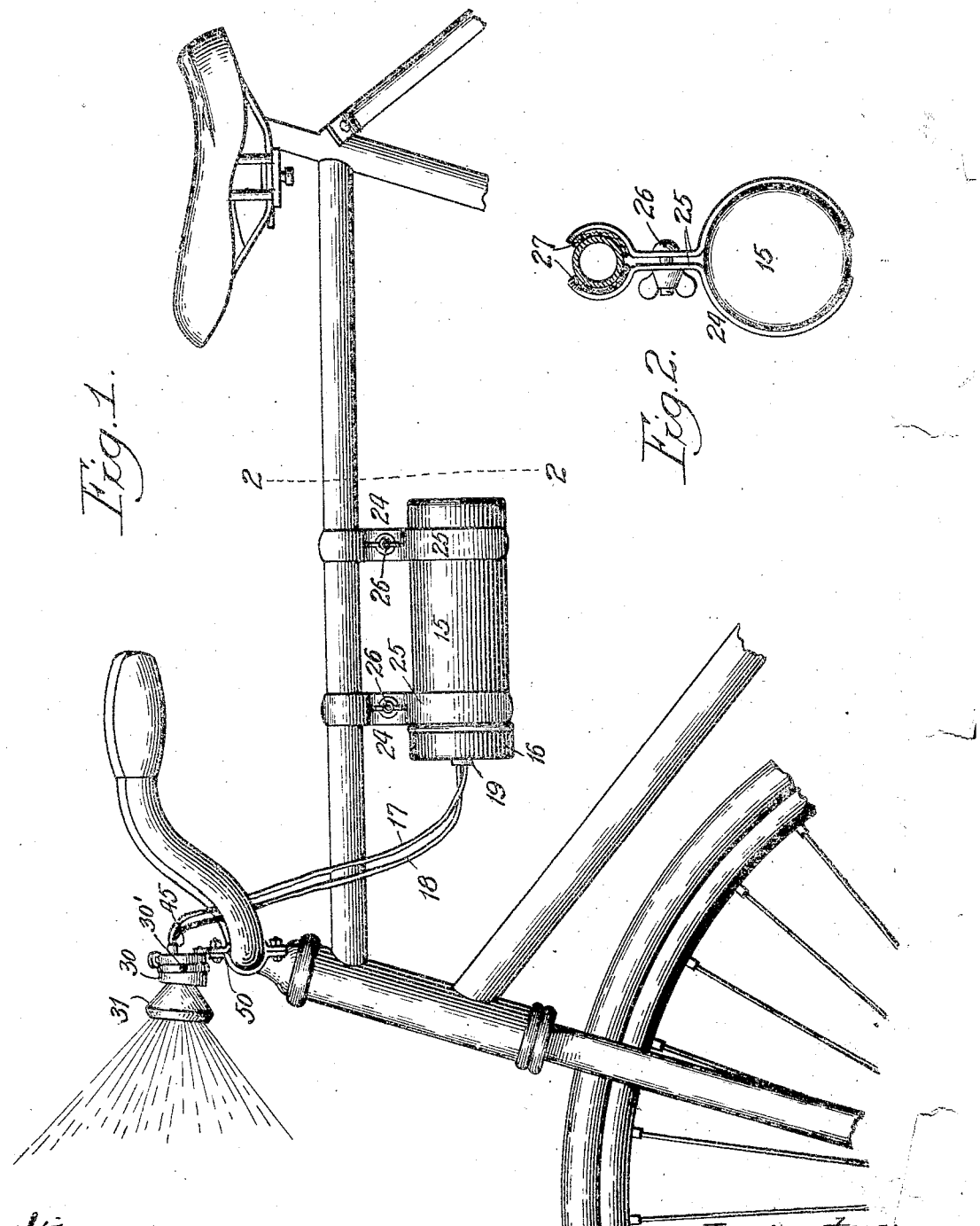

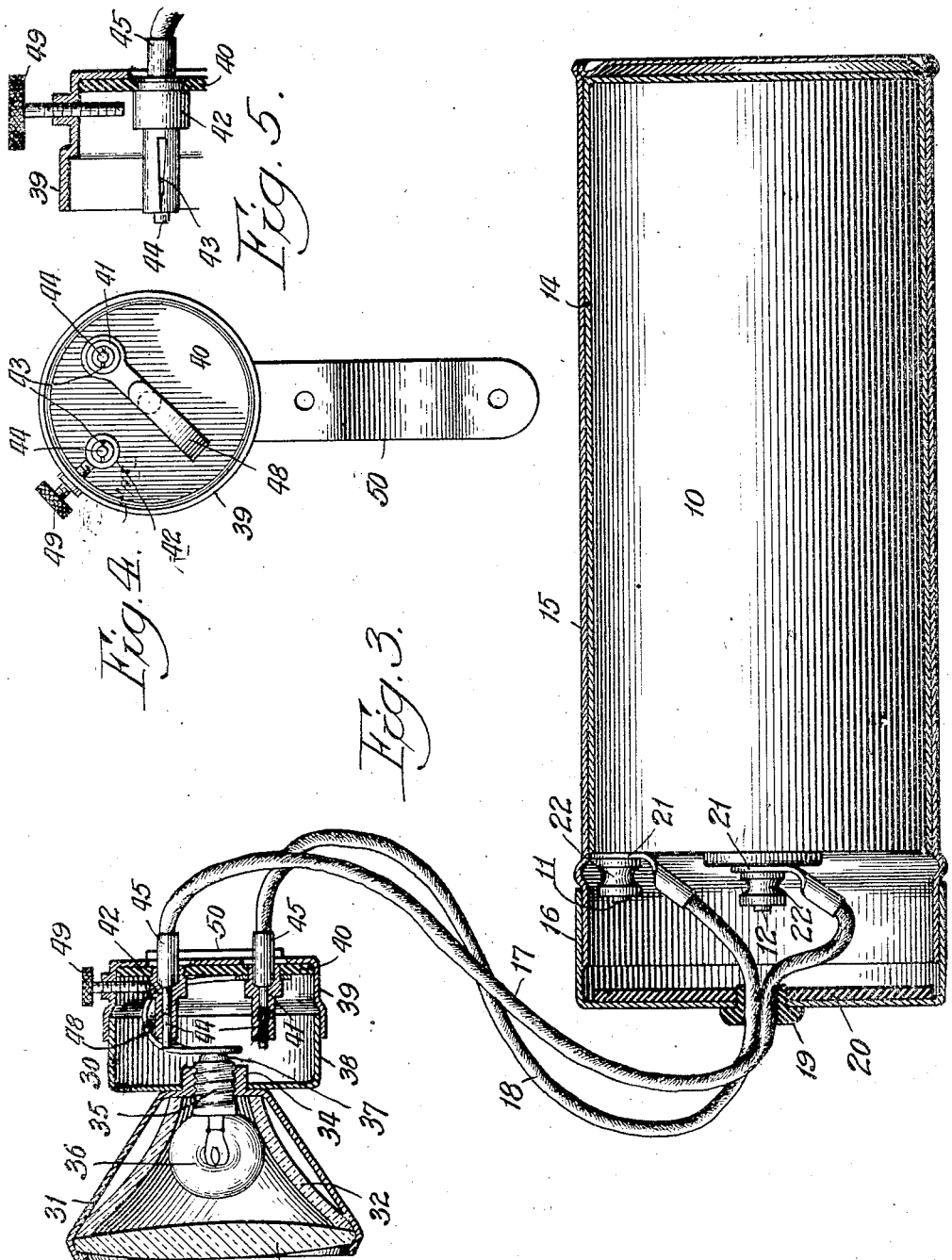

JOHN J. BROWNRIGG, HARRY HENDERSON, AND ARTHUR E. CASE, OF MARION, INDIANA, ASSIGNORS TO DELTA ELECTRIC COMPANY, OF MARION, INDIANA, A CORPORATION OF INDIANA.

PORTABLE ELECTRIC LAMP.

1,250,960.    Specification of Letters Patent.    Patented Dec. 25, 1917.

Application filed May 3, 1915. Serial No. 25,367.

*To all whom it may concern:*

Be it known that we, JOHN J. BROWNRIGG, HARRY HENDERSON, and ARTHUR E. CASE, residents of Marion, in the county of Grant and State of Indiana, respectively, have invented new and useful Improvements in Portable Electric Lamps, of which the following is a full, clear, and exact description.

The invention relates to portable electric lamps, and more particularly to lamps adapted for use on vehicles, such as bicycles or motor cycles.

One object of the invention is to provide an improved portable electric lamp and holder which are adapted for attachment to one part of the vehicle, and a battery holder which is adapted to be attached to another part, with flexible electric connections between the lamp holder and a dry battery in said battery holder.

A further object of the invention is to provide simple and efficient means for closing and breaking the lamp circuit, particularly adapted for use on vehicles where the lamp and connections therefor are subjected to vibration.

A further object of the invention is to provide an improved portable electric lamp and holder which is simple in construction and can be produced at a low cost.

The invention consists in the several novel features hereinafter set forth and more particularly defined by claims at the conclusion hereof.

In the drawings: Figure 1 is a side elevation of a device embodying the invention and applied to a bicycle. Fig. 2 is a section taken on line 2—2 of Fig. 1. Fig. 3 is a longitudinal section through the battery box and the lamp holder. Fig. 4 is a front view of the rear portion of the box containing the electrical connections for the lamp. Fig. 5 is an enlarged section showing the switch screw in the position assumed when the lamp circuit is broken.

The improved device comprises a box 15 for containing a dry battery 10 having poles 11 and 12 at one end thereof. This battery is usually provided with an insulating jacket 14 and the box 15 has one of its ends open to permit access to and removal of the battery from the box. The open end of this box is closed by a cap or cover 16. Flexible conductors 17 and 18 extend through a sleeve 19 of insulating material which is secured in the cap. The inner face of the cap is covered by a disk 20 of insulating material to prevent a short circuit in event the battery slips forward to the front end of the box. The flexible conductors 17 and 18 are each provided with a suitable metallic terminal 21 adapted to be secured to the poles of the battery, respectively, by screws 22. The battery box is secured to one of the frame-bars of the bicycle by a pair of clamps 24. Each of these clamps comprises a pair of members 25 having their upper portions curved to engage the opposite sides of the frame-bar and their lower portions formed to extend around the battery-box, and a screw 26 for forcing the jaws together to clamp the frame-bar and battery-box between the members. The upper portions of members 25 are faced with strips of felt 27 to prevent the clamps from marring the frame.

The lamp holder which is usually secured to the front portion of the vehicle, such as the handle bar of the bicycle, comprises a box 30, and a lamp-hood 31, containing a reflector 32 and a lens 33, and which is rigidly secured to the front wall of the box. Hood 31 is provided with a nipple 34 which extends through the front wall of the box and into the box. This nipple is screw-threaded conformably to the screw-thread on the base 35 of an incandescent lamp 36. The tip-contact 37 of the lamp is insulated from the base 35 as usual. The flexible connections 17, 18 permit relative adjustment of the battery box and lamp holder on the vehicle.

The box 30 is formed of interfitting cup-shaped members or sections 38, 39 which are removably held together by a screw 30' to permit separation for access to the connections in the box. A clamp 50 fixed to the section 39 is adapted to be clamped to the handle bar of a bicycle to support the box 30, as shown in Fig. 1. The back wall of box-member 39 has riveted thereto a disk 40 of insulating material and a pair of sockets 41, 42 are secured in separated relation on this disk. Each of these sockets has its front portion split, as at 43, to spring against and grip the reduced front end or pin 44 on the terminal 45 of one of the flexible conductors 17, 18. The back wall of member 39 is provided with openings or is cut away so that the conductor-terminals 45 will not contact with the box, and as a result of securing these sockets in the disk of insulation both will be electrically disconnected from the box. A bowed, flat resilient conductor-strip 48 is secured between a shoulder on socket 41 and disk 40, and is extended in position to engage the tip-contact 37 of the member 36. The threaded sleeve 34 in contact with the lamp base 35 serves as a conductor between the box 30 and the lamp-base. A switch-screw 49 is threaded into and extends through the back member 39 of the box 30 and its inner end is adapted to engage the socket 42. The screw may be turned from the outside of the box.

When the screw 49 is in position shown in Figs. 3 and 4, a circuit for the operation of the lamp 36 will be established, as follows: pole 12, terminal 21, flexible conductor 17, terminal 45 of said conductor, socket 42, screw 49, the walls of box 30, sleeve 34, lamp-base 35, the lamp filament, tip-contact 37, conductor strip 48, socket 41, terminal 45 of flexible conductor 18, conductor 18, terminal 21 of conductor 18 and pole 11 of the battery.

When the screw 49 is turned so that its inner end will be out of contact with socket 42, the circuit will be interrupted.

The invention exemplifies a portable electric lamp which is adapted for use on vehicles and which is simple in construction and can be produced at a low cost. The pin and spring-socket connections between the flexible conductors and the box provide simple and efficient detachable connections which permit the holder and battery box to be disconnected. In use, it is frequently desirable to remove the battery box or lamp from the vehicle or both. The screw 49 may be tightly screwed down to provide a connection which will not be loosened by vibration.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. In a device of the character described, the combination with a holder, of sockets in said holder split at their ends away from the points of entrance of the battery connection terminals and adapted to receive said terminals.

2. In a device of the character described, the combination with a holder, of sockets in said holder split at their ends away from the points of entrance of the battery connection terminals and adapted to receive said terminals, and a resilient conductor in electrical connection with one of said sockets and adapted to contact with a lamp to form one connection, the other connection being through the holder.

JOHN J. BROWNRIGG.
H. HENDERSON.
ARTHUR E. CASE.

Witnesses:
H. P. DIEDRIKS,
L. W. GARRISON.